(12) United States Patent
Chow et al.

(10) Patent No.: US 10,836,146 B2
(45) Date of Patent: Nov. 17, 2020

(54) FLEXIBLE GEOMEMBRANE

(71) Applicant: KURARAY CO., LTD., Kurashiki (JP)

(72) Inventors: Edgard Chow, Houston, TX (US);
Astrid Torres, Houston, TX (US);
Wataru Hirose, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/409,360

(22) Filed: May 10, 2019

(65) Prior Publication Data

US 2019/0344547 A1 Nov. 14, 2019

Related U.S. Application Data

(60) Provisional application No. 62/670,060, filed on May 11, 2018.

(51) Int. Cl.
| | |
|---|---|
| *B32B 7/12* | (2006.01) |
| *B32B 27/08* | (2006.01) |
| *B32B 27/30* | (2006.01) |
| *B32B 37/15* | (2006.01) |
| *E02D 31/00* | (2006.01) |
| *B09B 1/00* | (2006.01) |

(52) U.S. Cl.
CPC ............... *B32B 27/08* (2013.01); *B32B 7/12* (2013.01); *B32B 27/304* (2013.01); *B32B 27/306* (2013.01); *B32B 37/153* (2013.01); *E02D 31/004* (2013.01); *B09B 1/004* (2013.01)

(58) Field of Classification Search
CPC ....... B09B 1/004; B32B 27/08; B32B 27/304; B32B 27/306; B32B 37/12; B32B 37/153; B32B 7/12; E02D 31/004
See application file for complete search history.

(56) References Cited

U.S. PATENT DOCUMENTS

2012/0177307 A1* 7/2012 Duan ................. B65D 75/5833
383/211

* cited by examiner

*Primary Examiner* — Lawrence D Ferguson
(74) *Attorney, Agent, or Firm* — Oblon, McClelland, Maier & Neustadt, L.L.P.

(57) ABSTRACT

Provided is a polyvinyl chloride ("PVC")/ethylene-vinyl alcohol ("EVOH") multilayer sheet used for the fabrication of liners and covers for the geotechnical industry ("geomembrane"), which sheet has both good flexibility and excellent barrier properties to organic solvents and gases.

20 Claims, 5 Drawing Sheets

FLEXIBLE GEOMEMBRANE

CROSS REFERENCE TO RELATED APPLICATIONS

This application claims priority under 35 U.S.C. § 119 from U.S. Provisional Application Ser. No. 62/670,060 (filed 11 May 2018), the disclosure of which is incorporated by reference herein for all purposes as if fully set forth.

FIELD OF THE INVENTION

The present invention relates to a polyvinyl chloride ("PVC")/ethylene-vinyl alcohol ("EVOH") multilayer sheet used for the fabrication of liners and covers for the geotechnical industry ("geomembrane"). It is particularly concerned with sheets having both good flexibility and excellent barrier properties to organic solvents and gases.

BACKGROUND OF THE INVENTION

Geomembranes are commonly used for the fabrication of liners and covers for the geotechnical industry, such as in refuse landfill, sewage and waste residue treatment plants, containment of residuals from oil and gas fields, and the like. Geomembrane materials are commonly homogeneous (made of one type of material), e.g. low-, medium- and high-density polyethylene (LDPE, MDPE, HDPE), polypropylene (PP), PVC, butyl rubber, chlorosulphonated polyethylene (CSPE/CPM), ethylene interpolymer alloy (EIA), or nitrile butadiene (NBR).

Many of those applications also need good barriers against volatile organic compounds (VOC) that pose a threat to soil, water and air quality. The contamination of organic solvents from waste to soil and underground water via diffusion through the geomembrane is a big potential risk. Gases from wastes are considered as risks for greenhouse effect, liability to human health and public odor complaints.

Particularly, plasticized PVC is known for its good flexibility, water resistance and chemical resistance, and is often used in geomembrane applications. PVC, however, is not particularly resistant to the migration of polar chemicals, and the plasticizer can readily bleed out in the presence of organic solvents and gases, degrading the PVC sheets over long-term use.

Alternatives to PVC have been described in the literature. For example, U.S. Pat. No. 5,221,570 discloses a multilayered co-extruded ground protection membrane consisting of outside layers of high-density polyethylene and a very-low-density polyethylene inner core layer. Such membranes are effective for preventing the passage of water and aqueous solutions.

DE3514383A1 discloses a plastic waterproofing sheet for preventing water from waste sites from entering ground water. The disclosed sheet has (a) outer layers of any material that can be welded and has a high chemical resistance and a high resistance to weather, ageing and ultraviolet rays, and also has a high tensile strength, such as a polyethylene, and (b) an inner layer having a high vapor impermeability and mechanical properties matching the outer layers, such as a polyamide, polyester, polyvinyl fluoride or polyethylene terephthalate.

EVOH is known for its low permeation of gases and VOC relative to other commonly-used thermoplastic polymers, and has been considered for geomembrane applications. For geomembrane use, EVOH needs to be used as multilayer sheet co-extruded with HDPE and LLDPE; however, such a multilayer sheet is stiff and sometimes difficult to practically apply for select geotechnical applications that require high flexibility such as pond liners, floating covers and tubular biodigesters for animal waste ponds, liners and covers for food waste and other organic matter biodigesters, secondary containment liners, potable water reservoirs, canal liners for wastewater operations, daily landfill covers, etc.

EP2489509A1 discloses a flexible multi-layer ground membrane that comprises the polyamide layers, EVOH layers and polyolefin layers that are bonded together. The chemical resistance of a polyolefin geomembrane, which is non-polar in nature (and so prevents the passage of polar liquids such as methanol) can be significantly increased by incorporating layers of polar polymers. The converse is also valid, i.e. the chemical resistance of a polar material, e.g. a polyamide, can be significantly increased by incorporating layers of non-polar polymers. An EVOH layer also provides a highly effective diffusion barrier to polar liquids in the membrane.

The prior art does not teach a practical EVOH-containing multilayer sheet that exhibits both good flexibility and excellent barrier resistance properties required for geomembrane applications, and does not suggest the use of a flexible geomembrane made of an EVOH layer, a PVC layer and polyolefin layers.

When considering the combination of PVC and EVOH layers, plasticized PVC is thermally sensitive and must be extruded at low temperatures (150~180° C.) to avoid polymer decomposition, while EVOH, due to its relatively high melting points (160~195° C.), must be extruded at higher temperatures (210~230° C.) than can normally be tolerated by PVC. Simultaneous coextrusion of PVC and EVOH, therefore, is not practically possible. Additionally, polyolefin generally does not adhere to PVC, so that thermal lamination to PVC and EVOH based polyolefin coextruded sheet is difficult. To date, there is no practical way to produce a multilayer sheet of PVC and EVOH without using adhesives between the PVC layer and the other layers.

SUMMARY OF THE INVENTION

In accordance with the present invention, it has been found that an ethylene terpolymer can adhere to PVC by thermal laminating and can be coextruded with EVOH. PVC/EVOH multilayer sheet, therefore, can be prepared by laminating an EVOH-based film to a PVC substrate either inline or in a subsequent process without using adhesives. The PVC/EVOH multilayer sheet obtained by this method is suitable for geomembrane in terms of flexibility, organic solvent barrier and long-term use.

The present invention addresses the above-described problem by providing a multilayer sheet (as generally shown in FIG. 1) comprising at least:

(a) a first outer layer comprising a film of a polyvinyl chloride resin composition, the first outer layer having an inner surface (22) and an outer surface (20);

(b) a second outer layer comprising a film of a hydrophobic resin composition, the second outer layer having an inner surface (26) and an outer surface (24);

(c) a core layer between the first outer layer and the second outer layer, the core layer comprising a film of an ethylene-vinyl alcohol copolymer resin composition, the core layer having an upper surface (28) in the direction of the first outer layer and a lower surface (30) in the direction of the second outer layer;

(d) a first internal layer between the first outer layer and the core layer, the first internal layer comprising a film of an ethylene terpolymer resin composition, the first internal layer comprising a top surface (32) in the direction of the first outer layer and a bottom surface (34) in the direction of the core layer, wherein the top surface (32) of the first internal layer is in contact with the inner surface (22) of the first outer layer;

(e) optionally a first adhesive resin layer between the first internal layer and the core layer, the first adhesive resin layer comprising a film of a first acid-functionalized polymer resin composition, the first adhesive resin layer having a top surface (36) in the direction of the first outer layer and a bottom surface (38) in the direction of the core layer; and (f) optionally a second adhesive resin layer between the second outer layer and the core layer, the second adhesive resin layer comprising a film of a second acid-functionalized polymer resin composition, the second adhesive resin layer having a top surface (42) in the direction of the core layer and a bottom surface (44) in the direction of the second outer layer;

wherein:

(I) if the first adhesive resin layer is present, then the bottom surface (38) of the first adhesive resin layer is in contact with the upper surface (28) of the core layer;

(II) if the first adhesive resin layer is not present, then (i) the first internal layer comprises a film of an acid-functionalized ethylene terpolymer resin composition, and (ii) the bottom surface (34) of the first internal layer is in contact with the upper surface (28) of the core layer;

(III) if the second adhesive resin layer is present, then the top surface (42) of the second adhesive resin layer is in contact with the lower surface (30) of the core layer; and (IV) if the second adhesive resin layer is not present, then (i) the second outer layer comprises a film of a hydrophobic acid-functionalized resin composition, and (ii) the inner surface (26) of the second outer layer is in contact with the lower surface (30) of the core layer.

In one embodiment (FIG. 2), the multilayer sheet is a four-layer sheet and does not contain either the first adhesive resin layer or the second adhesive resin layer.

In another embodiment (FIG. 3), the multilayer sheet is a five-layer sheet and does not contain the first adhesive resin layer.

In another embodiment (FIG. 4), the multilayer sheet is a five-layer sheet and does not contain the second adhesive resin layer.

In another embodiment (FIG. 5), the multilayer sheet is a six-layer sheet and further comprises both the first adhesive resin layer and the second adhesive resin layer.

In another embodiment, the multilayer sheet comprises more than six layers, further comprises both the first adhesive resin layer and the second adhesive resin layer, and still further comprises:

(i) at least one additional layer between the first adhesive layer and the first internal layer;

(ii) at least one additional layer between the second adhesive layer and the second outer layer; or (iii) both (i) and (ii).

In such structure with more than six layers (seven or more layers), the multilayer sheet can be viewed as follows:

(a) a top section with the first outer layer and first internal layer touching;

(b) a middle section with the first and second adhesive layers touching the core layer, and (c) a bottom section with the second outer layer, wherein (i) there is at least one additional layer between the top and middle sections, (ii) there is at least one additional layer between the middle and bottom sections, or (iii) both (i) and (ii).

In another embodiment, when the first adhesive resin layer is present the ethylene terpolymer is selected from an ethylene/n-butyl acrylate/carbon monoxide terpolymer and an ethylene/vinyl acetate/carbon monoxide terpolymer.

In another embodiment, the ethylene-vinyl alcohol copolymer of the core layer has a degree of saponification of about 99 mol % or greater.

In another embodiment, the ethylene-vinyl alcohol copolymer of the core layer has an ethylene content of about 18 mol % or greater to about 55 mol % or less.

In another embodiment, the multilayer sheet has a total thickness of greater than about 100 μm to about 4000 μm; and/or the thickness of the first outer layer is from about 50 μm to 3000 μm; and/or the thickness of the second outer layer is from about 20 μm to about 1000 μm; and/or the thickness of the first internal layer is from about 10 μm to about 300 μm; and/or the thickness of the core layer is from about 5 μm to about 150 μm; and/or if present the thickness of the first adhesive layer is from about 5 μm to about 150 μm; and/or, if present, the thickness of second adhesive layer is from about 5 μm to about 150 μm.

Also provided is a process for the preparation of a multilayer sheet as described above, comprising the steps of:

(i) coextruding all layers except the first outer layer to produce a multilayer structure; and (ii) thermally laminating the first outer layer to the multilayer structure.

Also, according to another aspect of the present invention, the multilayer sheet has permeation coefficient for benzene, toluene, ethyl benzene and xylene of less than $0.1*10^{-10}$ m2/s.

According to the aspects of the present invention, a multilayer sheet is provided that is superior in flexibility, water resistance and chemical resistance, has excellent organic solvent barrier and is also suitable for long-term geomembrane use.

These and other embodiments, features and advantages of the present invention will be more readily understood by those of ordinary skill in the art from a reading of the following detailed description.

DETAILED DESCRIPTION

Figure 1:
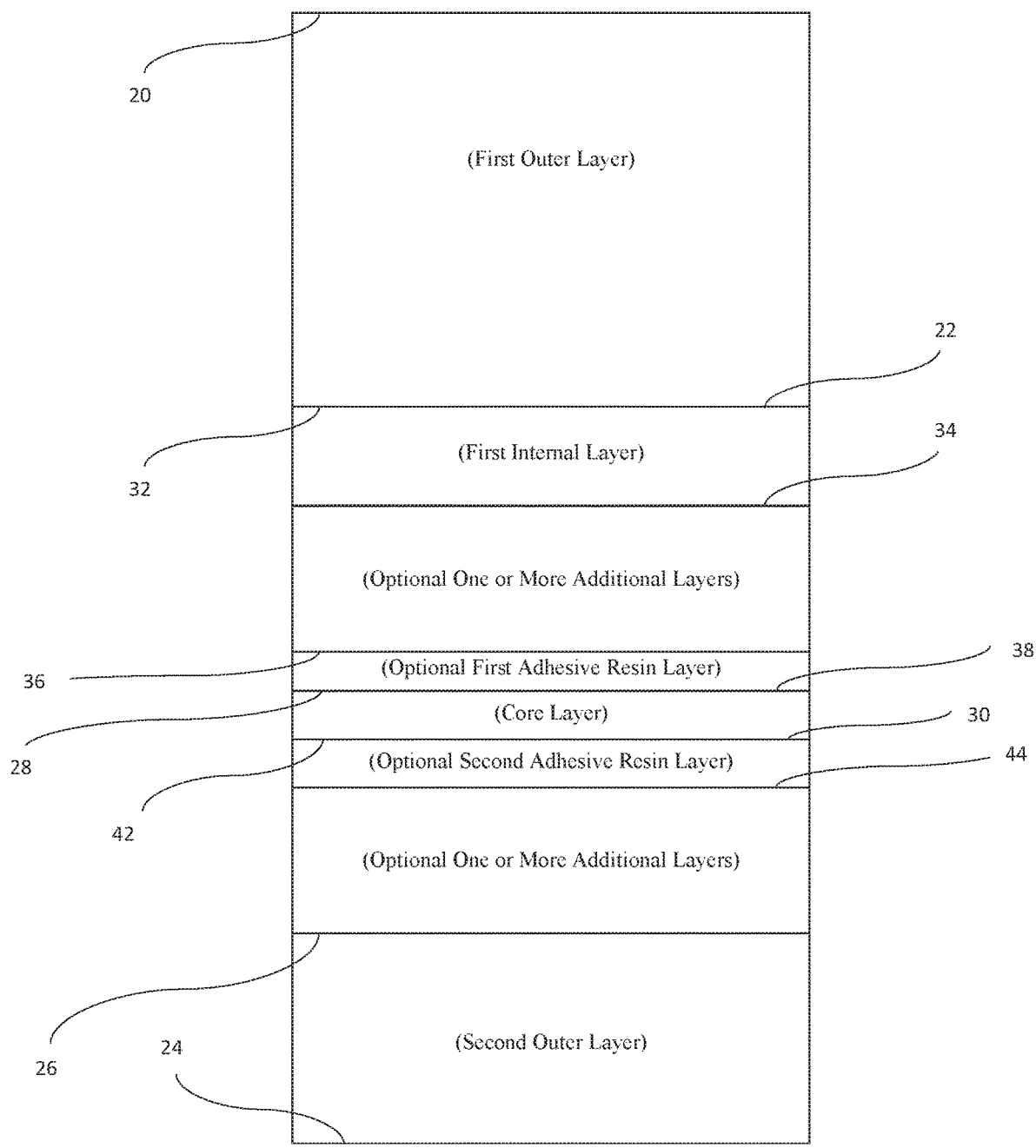
FIG. 1 is a schematic diagram of a generalized embodiment of a multilayer sheet in accordance with the present invention showing required and optional layers.

The present invention relates to a PVC/EVOH multilayer sheet used for the fabrication of liners and covers for the geotechnical industry as a geomembrane. It is particularly concerned with both good flexibility and excellent barrier to organic solvents and gases. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

PVC Resin Composition

The first outer layer of a multilayer sheet in accordance with the present invention is formed from a PVC resin composition.

The terms "polyvinyl chloride" and "PVC", as used herein, refer to neat polyvinyl chloride polymer, to copolymers of vinyl chloride with other comonomers, or to compositions comprising polyvinyl chloride polymer and at least one additional material. Since commercial polyvinyl chloride resin typically contains processing aids, plasticizers, stabilizers, and possibly other additives, the amount of polyvinyl chloride in commercial polyvinyl chloride resin is always less than 100%.

PVC resin compositions suitable for use in the present invention are generally known, for example, as otherwise currently used in geomembrane applications, as will be recognized by one of ordinary skill in the relevant art.

The PVC may be prepared by bulk, suspension, emulsion, microsuspension or suspended emulsion polymerization. The difference between the products lies essentially in the particle size of the polymer particles obtained.

Intrinsic viscosity is the solution viscosity of a polymer that is extrapolated to zero concentration of polymer. Intrinsic viscosity is a standard method for characterizing the molecular weight of polymers such as polyvinyl chloride. A factor known as the K value is used to indicate the mean molecular weight of polyvinyl chloride. The K value is a unitless empirical parameter closely related to intrinsic viscosity, often used in slightly different ways in different industries to express a viscosity-based estimate of statistical molecular mass of polymeric material. The most commonly used K value in Europe is the Fikentscher K value (referenced in DIN EN ISO 1628-1), which is obtained by a combination of measuring dilute solution viscometry and solving the Fikentscher equation. The K value is also the subject of German standard DIN 53726. Typically, higher K values are correlated with better mechanical properties and with lower flowability or higher viscosity.

In preferred embodiments, the PVC resin has a Fikentscher K value of from about 50, or from about 55, to about 70.

The PVC resin composition may typically include various additives, such as pigments or fillers, plasticizers, lubricants, UV stabilizers, heat stabilizers, processing aids, antioxidants, etc.

PVC without modification is very brittle, and thus it is typically made more flexible by plasticization with low or high molecular weight plasticizers, for example, one or more phthalate plasticizers such as a branched or unbranched alkyl phthalates like diethyl hexyl phthalate (DEHP), diisononyl phthalate, phthalates of $C_7$-$C_{11}$ linear alcohols or mixtures thereof, and diisodecyl phthalate.

The additive may also be a polymer or copolymer whose function is to provide flexibility or to improve impact strength, such as a polyvinyl acetate, polyvinyl butyral or polyvinyl alcohol.

Another typical additive is a heat stabilizer containing barium, zinc, tin and/or calcium, such as a zinc organometallic soap optionally combined with costabilizers, such as epoxided soybean oil. One particularly preferred heat stabilizer is an octyltin thioglycolate/dioctyltin thioglycolate mixture.

Generally, a dry blend PVC composition comprises from about 10%, or from about 30%, or from about 40%, to about 70%, or to about 60%, by weight of the plasticizer, based on the total weight of the PVC resin composition.

Ethylene Terpolymer Resin Composition

The first internal layer of a multilayer sheet in accordance with the present invention is formed from an ethylene terpolymer resin composition.

The ethylene terpolymer is preferably an ethylene/X/carbon monoxide terpolymer alone or blended with another polymer. The E/X/CO terpolymer can comprise copolymerized units derived from ethylene and alkyl (meth)acrylate or vinyl acetate and up to about 35 weight % of copolymerized units of carbon monoxide, based on the total weight of the E/X/CO terpolymer. Ethylene terpolymers of the general formula "E/X/CO" are polymers functionalized with carbon monoxide, which enables a small amount of acetate, acrylate or acrylic acid comonomer to be used. Examples of ethylene carbon monoxide terpolymers include: a) ethylene terpolymers of the general formula E/X/CO where E represents copolymerized residues of ethylene, X represents copolymerized residues of a "softening" monomer such as, for example, vinyl acetate or a (meth)acrylic ester, and CO represents copolymerized residues of carbon monoxide; and b) ethylene carbon monoxide-functional copolymer that is anhydride-modified in the form of E/X/CO/grafted MA, e.g., obtained by grafting reaction between the preformed E/X/CO copolymer with maleic acid or maleic anhydride.

Suitable ethylene carbon monoxide terpolymers include an ethylene/alkyl (meth)acrylate/carbon monoxide terpolymer, an ethylene/vinyl acetate/carbon monoxide terpolymer, and combinations thereof. A (meth)acrylate can be an alkyl acrylate or an alkyl methacrylate. The alkyl group can contain 1 to 8, or 1 to 4, carbon atoms. Examples of suitable alkyl groups include methyl, ethyl, propyl, butyl, and combinations of two or more thereof. In general terms, the ethylene provides strength, the (meth)acrylate or vinyl acetate provides softness, and the carbon monoxide provides additional polarity. Generally for these copolymers, the proportion of copolymerized ethylene will be about 40 wt % to about 80 wt %. The proportion of copolymerized (meth)acrylate or vinyl acetate will be from about 5 wt %, or from about 10 wt %, to about 60 wt %, or to about 35 wt %. The proportion of copolymerized carbon monoxide will be from about 3 wt % to about 35 wt % percent, or to about 20 wt %, or to about 10 wt %. The above weight percentages are based on a total 100 wt % of the E/X/CO copolymer.

Ethylene/alkyl (meth)acrylate/carbon monoxide copolymers can be produced by processes well known in the art using either autoclave or tubular reactors. See e.g., U.S. Pat. Nos. 2,897,183, 3,404,134, 5,028,674, 6,500,888 and 6,518,365. Processes for manufacturing ethylene/carbon monoxide terpolymers are also described in U.S. Pat. Nos. 3,780,140 and 4,497,941.

Preferred ethylene/alkyl (meth)acrylate/carbon monoxide copolymers are ethylene/n-butyl acrylate/carbon monoxide (EnBACO). An EnBACO terpolymer containing about 10 wt % carbon monoxide, about 30 wt % n-butylacrylate, and ethylene constituting the balance can be prepared according to the general process and in the equipment described in U.S. Pat. No. 3,780,140. EnBACO terpolymer resins are also commercially available under the trademark ELVALOY® from E. I. du Pont de Nemours and Company, Wilmington, Del. USA. These polymers may have an average molecular weight of about 250,000-400,000 daltons. They are non-migrating and have good chemical resistance. A mixture of two or more different ethylene alkyl (meth)acrylate carbon monoxide copolymers can also be used.

Ethylene/vinyl acetate/carbon monoxide (EVACO) is another suitable polymer. The relative amount of vinyl acetate comonomer incorporated into EVACO can be from about 0.1 wt %, or from about 5 wt %, or from about 10 wt %, to about 50 wt %, or to about 40 wt %, or to about 35 wt %, with the amount of copolymerized carbon monoxide being from about 3 wt % to about 30 wt %, or to about 10 wt % of the copolymer, the remainder of the weight of the EVACO being copolymerized ethylene.

Alternatively, and in particular when the first adhesive layer is not present, the E/X/CO terpolymer may be grafted with an acid-functional monomer such maleic anhydride or another graft comonomer. Such acid-modified E/X/CO terpolymers ("E/X/CO/grafted MA") contain carboxylic acid and/or anhydride groups pendant from the polymer backbone. E/X/CO/grafted MA can adhere to both PVC and EVOH. The monomer may be selected from the group consisting of ethylenically unsaturated carboxylic acids and ethylenically unsaturated carboxylic acid anhydrides, derivatives of such acids and ethylenically unsaturated hydrocarbons with other functional groups. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride, e.g. dimethylmaleic anhydride. Examples of the derivatives of the unsaturated acids are salts, amides, imides and esters e.g. mono- and disodium maleate, acrylamide, maleimide and diethyl fumarate. Examples of ethylenically unsaturated hydrocarbons with other functional groups are vinyl pyridines, vinyl silanes and unsaturated alcohols, e.g. 4-vinyl pyridine, vinyltriethoxysilane and allyl alcohol. Acid modification preferably is obtained by grafting reaction between the preformed copolymer with one or more of the above acid-functional monomers, for example, grafting with maleic acid or maleic anhydride monomers to form succinic anhydride groups on the copolymer by conventional procedures. Typically, the amount of acid modification, that is, the amount of grafted comonomer, will be from about 0.1 to about 5 wt % based on the weight of the grafted copolymer. Techniques for the grafting of such monomers are known, e.g., as described in U.S. Pat. No. 5,618,881.

EVOH Resin Composition

The core layer of a multilayer sheet in accordance with the present invention is formed from an EVOH resin composition.

The EVOH of the EVOH resin composition is a copolymer having as a main structural unit an ethylene unit and a vinyl alcohol unit.

The EVOH desirably has, as a lower limit of ethylene unit content (a proportion of the number of ethylene units to the total number of monomer units in the EVOH), an ethylene unit content of about 20 mol % or greater, or about 22 mol % or greater, or about 24 mol % or greater. On the other hand, the EVOH desirably has, as an upper limit of ethylene unit content, an ethylene unit content of about 60 mol % or less, or about 55 mol % or less, or about 50 mol % or less. The EVOH having an ethylene unit content of no less than the lower limit gives a crosslinked product an excellent oxygen barrier properties in high humidity and gives excellent melt moldability. In addition, the EVOH having an ethylene unit content of no greater than the upper limit gives excellent oxygen barrier properties.

The EVOH typically has, as a lower limit of degree of saponification (a proportion of the number of vinyl alcohol units to the total number of the vinyl alcohol units and vinyl ester units in the EVOH), a degree of saponification of about 80 mol % or greater, or about 95 mol % or greater, or about 99 mol % or greater. On the other hand, the EVOH typically has, as an upper limit of degree of saponification, a degree of saponification of (substantially) 100 mol %, or about 99.99 mol % or less. The EVOH having a degree of saponification of no less than the lower limit gives excellent oxygen barrier properties and thermal stability.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. At this time, the copolymerization may be performed under presence of thiol compounds such as thioacetic acid and mercaptopropionic acid, or other chain-transfer agents.

As a saponification reaction, alcoholysis, hydrolysis, and the like, which uses a well-known alkali catalyst or acidic catalyst as a saponification catalyst in an organic solvent, may be adopted. In particular, a saponification reaction using a caustic soda catalyst with methanol as a solvent is simple and easy, and thus, most preferable.

The EVOH used in the EVOH resin composition may be a combination of two or more different types of EVOH. For example, the EVOH can be composed of a mixture of two or more types of EVOH that are different in ethylene unit content, with the combination having an ethylene content that is calculated as an average value from a mixed mass ratio. In this case, the difference between two types of EVOH that have different ethylene unit contents is typically about 30 mol % or less, or about 20 mol % or less, or about 15 mol % or less.

Similarly, the EVOH can be composed of a mixture of two or more types of EVOH that are different in degree of saponification, with the combination having a degree of saponification that is calculated as an average value from a mixed mass ratio. In this case, the difference in degree of saponification is typically about 7% or less, or about 5% or less When a crosslinked product obtained from the resin composition containing the EVOH is molded into a multilayered structure that is desired, as a multilayered structure, to achieve a balance between thermal moldability and oxygen barrier properties at a high level, the EVOH is preferably used that is obtained by mixing an EVOH having an ethylene unit content of from about 24 mol % to about 34 mol % and a degree of saponification of about 99% or greater, with an EVOH having an ethylene unit content of from about 34 mol % to about 50 mol % and a degree of saponification of about 99% or greater, in a blending mass ratio of about 60/40 to about 90/10.

The ethylene unit content and the degree of saponification of the EVOH can be determined by nuclear magnetic resonance (NMR) analysis by conventional methods as recognized by one or of ordinary skill in the relevant art.

The EVOH typically has, as a lower limit of a melt flow rate (a measured value at a temperature of 190° C. and a load of 2160 g in accordance with JIS K 7210), a melt flow rate of about 0.1 g/10 min or more, or about 0.5 g/10 min or more, or about 1 g/10 min or more, or about 3 g/10 min or more. On the other hand, the EVOH typically has, as an upper limit of a melt flow rate, a melt flow rate of about 200 g/10 min or less, or about 50 g/10 min or less, or about 30 g/10 min or less, or about 15 g/10 min or less, or about 10 g/10 min or less. The EVOH having a melt flow rate value in the above range improves melt kneadability and melt moldability of a resultant resin composition.

A modified EVOH can also be used. For example, a modified EVOH can have at least one structural unit selected from, for example, structural units (I) and (II) shown below.

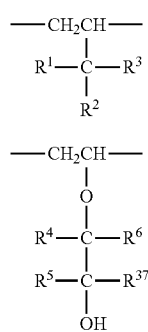

When present, such the structural unit are present at a ratio of from about 0.5 mol % to about 30 mol % based on the total structural units. Such a modified EVOH may improve flexibility and moldability of a resin or a resin composition, the interlayer adhesion, stretchability and thermoformability of the inner liner.

Each of R1, R2 and R3 in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of R1, R2 or R3 may be combined together (excluding a pair of R1, R2 or R3 in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of R4, R5, R6 and R7 in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. R4 and R5, or R6 and R7 may be combined together (excluding when both R4 and R5 or both R6 and R7 are hydrogen atoms). Also, the aliphatic hydrocarbon group having 1 to 10 carbon atoms, the alicyclic hydrocarbon group having 3 to 10-carbon atoms, or the aromatic hydrocarbon group having 6 to 10 carbon atoms may have the hydroxy group, an alkoxy group, the carboxy group or the halogen atom.

In another example, the following modified EVOH can be used as the EVOH, wherein the modified EVOH copolymer is represented by a following formula (III), contents (mol %) of a, b, and c based on the total monomer units that satisfy following formulae (1) through (3), and a degree of saponification (DS) defined by a following formula (4) is not less than about 90 mol %.

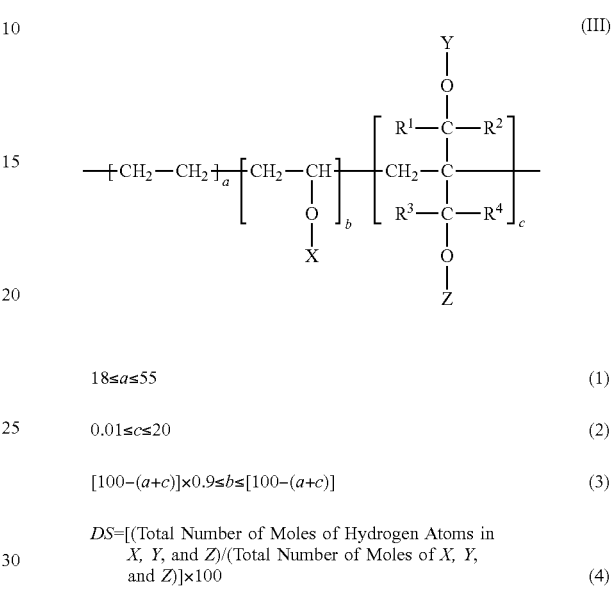

$$18 \leq a \leq 55 \tag{1}$$

$$0.01 \leq c \leq 20 \tag{2}$$

$$[100-(a+c)]\times 0.9 \leq b \leq [100-(a+c)] \tag{3}$$

$$DS=[(\text{Total Number of Moles of Hydrogen Atoms in } X, Y, \text{ and } Z)/(\text{Total Number of Moles of } X, Y, \text{ and } Z)]\times 100 \tag{4}$$

In the formula (III), each of R1, R2, R3, and R4 independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

The EVOH may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri (2-methoxyethoxy)silane, and γ-methacryloxypropyltrimethoxysilane; unsaturated sulfonic acids or salts thereof; unsaturated thiols; and vinylpyrrolidones.

The EVOH resin composition may contain other optional components within a range not to impair the effects of the present invention. Examples of such other components include, for example, a boron compound, an alkali metal salt, a phosphoric acid compound, an oxidizable substance, another polymer, an oxidization accelerator, and another additive.

Addition of a boron compound to the EVOH resin composition may be advantageous in terms of improving melt viscosity of the EVOH and obtaining a homogenous coextrusion molded product or a coinjection molded product. Examples of suitable boron compounds include boric acids, a boric acid ester, a boric acid salt, and boron hydrides. Specific examples of the boric acids include orthoboric acid (hereinafter, also merely referred to as "boric acid"), metaboric acid and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically from about 20 ppm, or from about 50 ppm, to about 2000 ppm, or to about 1500 ppm, in terms of the boron element equivalent. The content of the boron compound in this range can give EVOH that is produced while torque variation is suppressed during heat melting.

The EVOH resin composition may also contain an alkali metal salt in an amount of from about 5 ppm, or from about 20 ppm, or from about 30 ppm, to about 5000 ppm, or to about 1000 ppm, or to about 500 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

The EVOH resin composition may also contain a phosphoric acid compound in an amount of from about 1 ppm, or from about 5 ppm, or from about 10 ppm, to about 500 ppm, or to about 300 ppm, or to about 200 ppm, in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the EVOH resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The EVOH resin composition may also contain various types of other additives within a range not to impair the effects of the present invention. Examples of such other additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

Adhesive Layers

The multilayer sheet in accordance with the present invention optionally contains at least one adhesive layer based on an acid-functionalized polymer resin composition. For adhesion between the layer of the EVOH resin composition (EVOH resin composition layer) and the layer of the ethylene terpolymer, an adhesive resin layer may be interposed between these layers.

Typical examples of suitable adhesive resins include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

In one embodiment, the first adhesive resin composition and the second adhesive resin composition are the same, or are based on the same acid-functionalized polymer resin. In another embodiment, the first adhesive resin composition and the second adhesive resin composition are not the same, or are based on different acid-functionalized polymer resins.

In another embodiment, the first adhesive resin composition is based on a maleic anhydride-graft-modified ethylene-vinyl acetate copolymer, and the second adhesive resin composition is based on polyethylene modified with maleic anhydride.

Other Hydrophobic Thermoplastic Resin Compositions

A resin contained in other constituent layers of the multilayer article of the present invention, which are not the layers of the PVC resin composition, EVOH resin composition, ethylene terpolymer resin composition and adhesive resin composition, are not particularly limited. In order to avoid moisture, which causes worse barrier property of the EVOH resin composition, the resin contained in other constituent layer (for example, second outer layer) is typically a hydrophobic thermoplastic resin composition comprising, as a predominant portion, one or more hydrophobic thermoplastic resins. Examples of suitable hydrophobic thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-20 α-olefin) copolymers; polybutenes; polypentenes; graft polyolefins obtained by graft modification of these polyolefins with an unsaturated carboxylic acid or an ester thereof; cyclic polyolefin resins, ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins such as chlorinated polyethylenes and chlorinated polypropylenes; and aromatic and aliphatic polyketones. In terms of mechanical strength and molding processability, polyolefin resins are preferable, and polyethylenes and polypropylenes are particularly preferable among these.

For the hydrophobic thermoplastic resin composition, an anti-ultraviolet agent and is preferably added. Examples of the anti-ultraviolet agent include an ultraviolet absorber, a light stabilizer, and a colorant.

The content of the anti-ultraviolet agent in the hydrophobic thermoplastic resin is typically from about 1% by weight, or about 2% by weight, or about 3% by weight, to about 10% by weight, or to about 8% by weight, or to about 5% by weight, based on the total weight of the hydrophobic thermoplastic resin composition. When the content is less than these ranges, the hydrophobic thermoplastic resin composition tends to be degraded by ultraviolet light. When the content is greater than these ranges, the hydrophobic thermoplastic resin composition has poor mechanical strength.

Regarding the melt viscosity of the hydrophobic thermoplastic resin composition, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the hydrophobic thermoplastic resin composition and the MFR of the EVOH resin composition is preferably small. When the melt viscosity of the hydrophobic thermoplastic resin composition is as described above, an excellent multilayer article without layer turbulence can be obtained.

Figure 2:
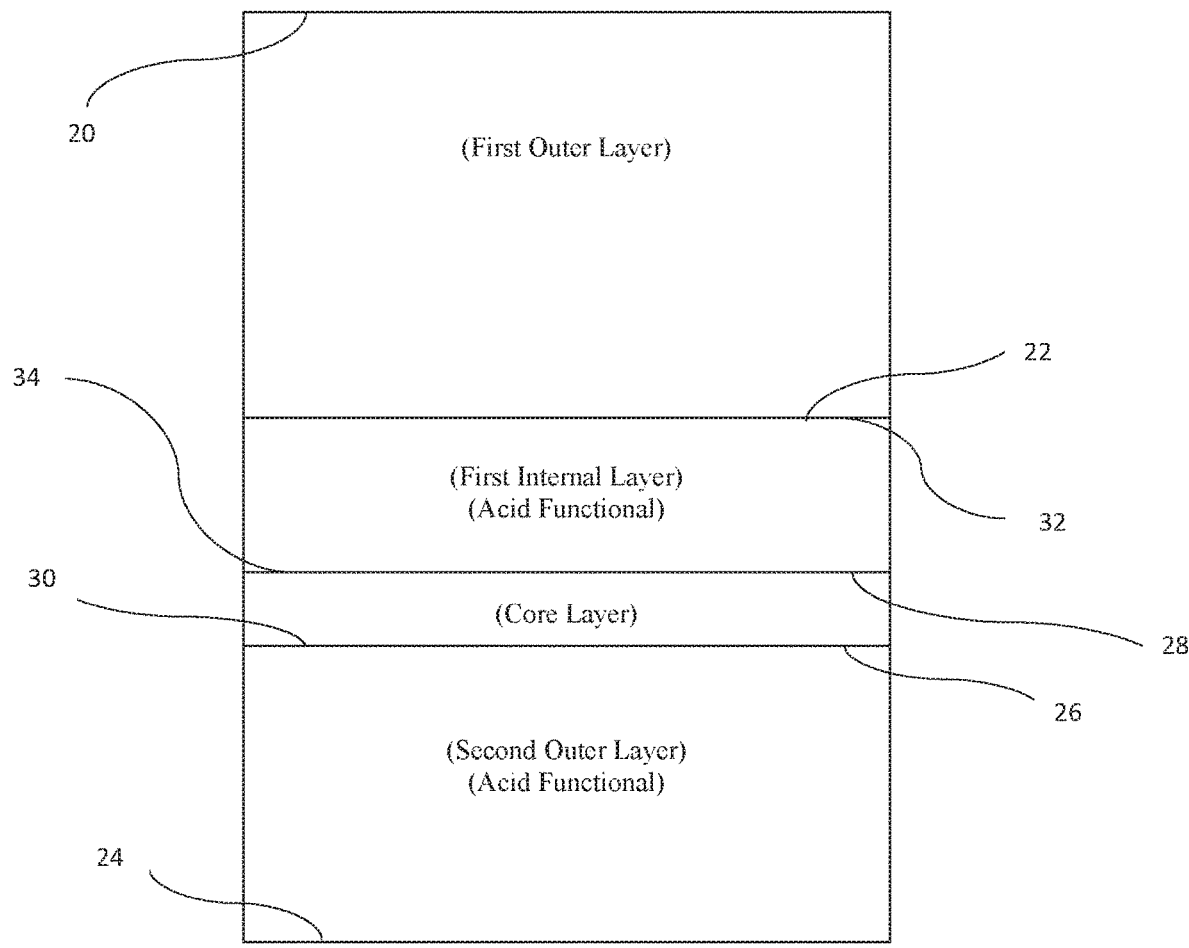
FIG. 2 is a schematic diagram showing a first specific embodiment of a multilayer sheet in accordance with the present invention that has four layers.
Figure 3:
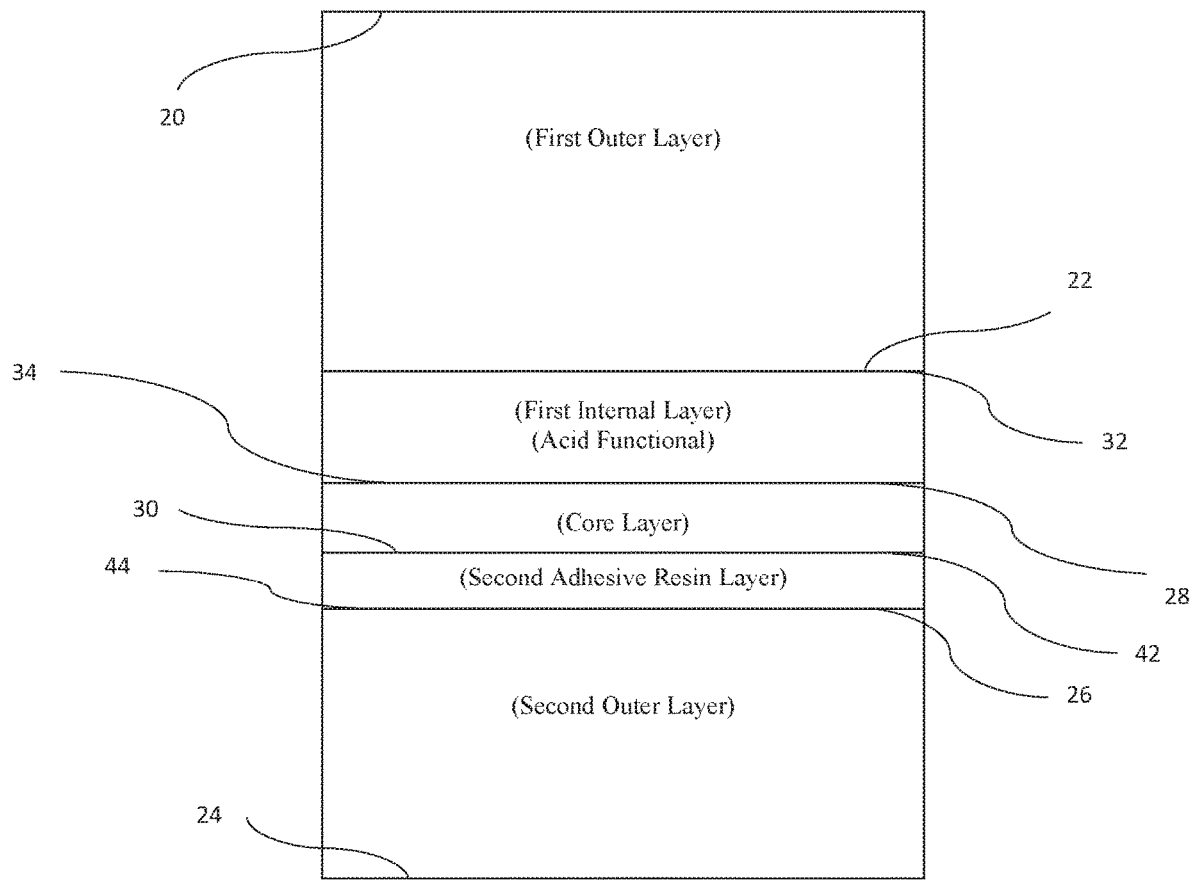
FIG. 3 is a schematic diagram showing a second specific embodiment of a multilayer sheet in accordance with the present invention that has five layers.
Figure 4:
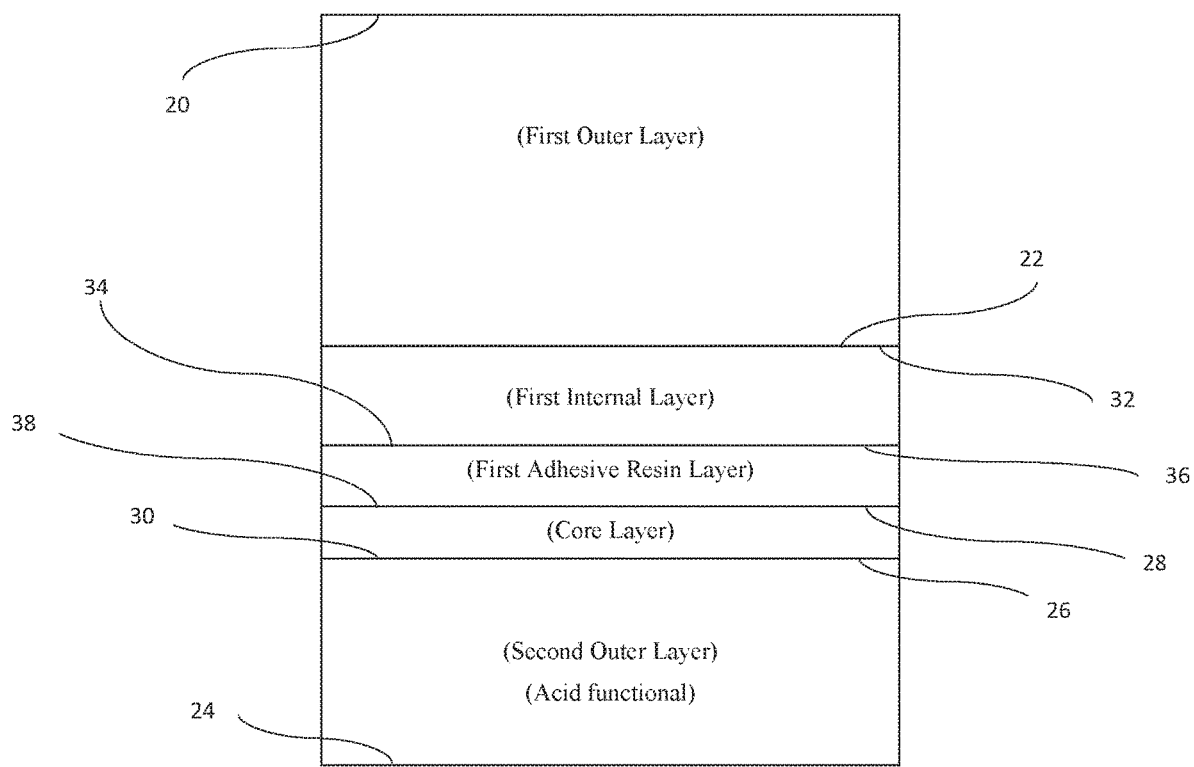
FIG. 4 is a schematic diagram showing a third specific embodiment of a multilayer sheet in accordance with the present invention that has five layers.
Figure 5:
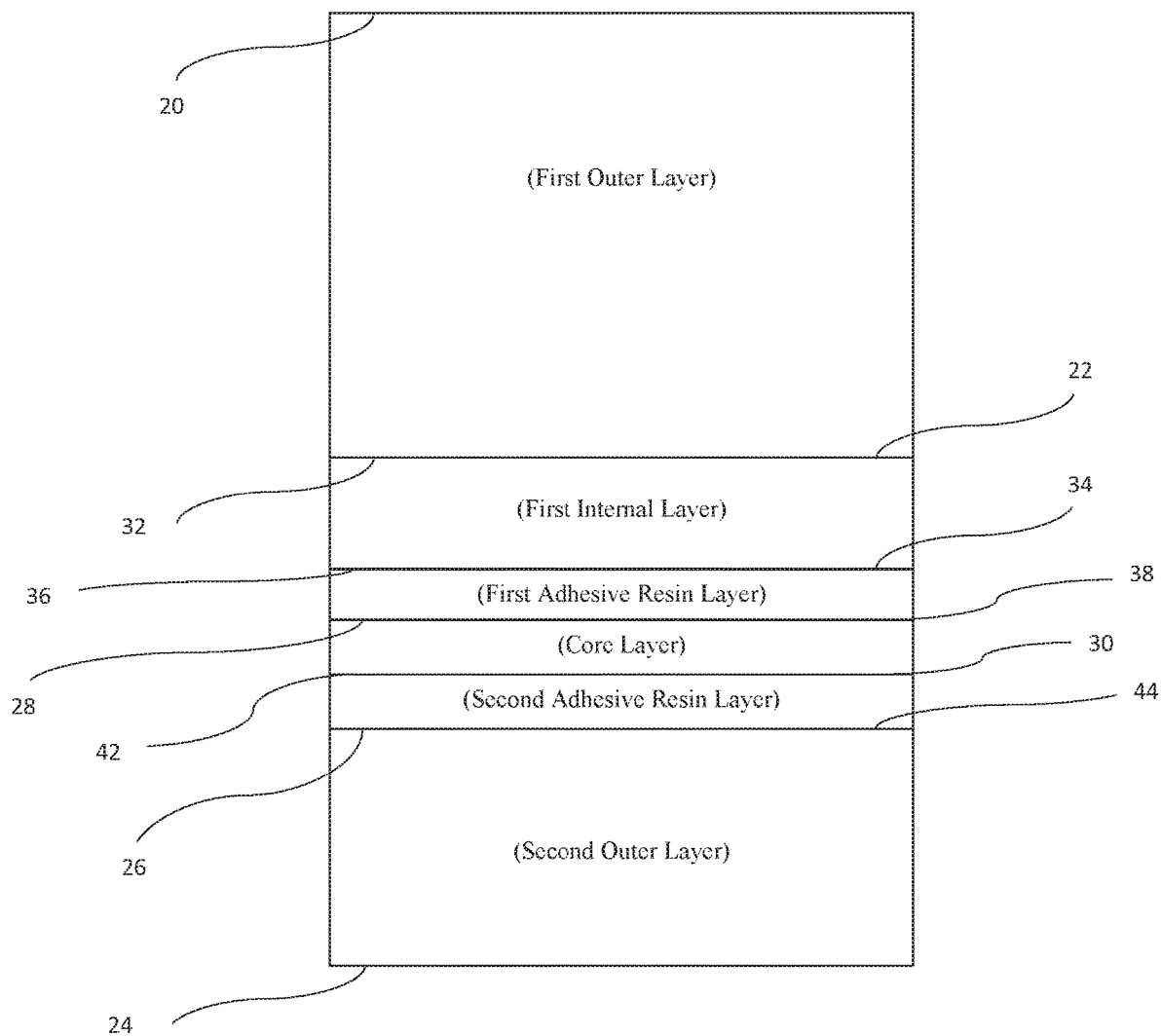
FIG. 5 is a schematic diagram showing a fourth specific embodiment of a multilayer sheet in accordance with the present invention that has six layers.

In a four-layer system as depicted in FIG. 2, or a five-layer system as depicted in FIG. 4, where there is no second adhesive resin layer, the second outer layer is based on a hydrophobic acid-functionalized resin composition as described above for the adhesive resin layer.

Additional Optional Layers

As indicated above, the multilayer sheets in accordance with the present invention may contain more than 6 layers such as depicted in FIG. 1.

Typically, the optional additional layers will be one or more of the core layer, first internal layer or second outer layer, typically in combination with one or more adhesive layers.

Alternatively, other functional layers can be incorporated into the multilayer sheets, such as materials to provide heat sealability, scuff resistance and toughness. Such other layers are generally known to those of ordinary skill in the relevant art.

Multilayer Sheets

An example of the layer structure of the multilayer sheet is shown below, in which the PVC resin composition layer (first outer layer) is represented as PVC, the ethylene terpolymer resin composition layer (first inner layer) as EC, the EVOH resin composition layer (core layer) as EVOH, the (each) adhesive resin layer as AD (may be the same or different), and the hydrophobic thermoplastic resin layer (second outer layer) as PO.

Four layers: PVC/EC/EVOH/PO (PO=hydrophobic acid-functionalized resin for this embodiment, EC=acid-functionalized ethylene terpolymer resin composition for this embodiment)

Five layers: PVC/EC/AD/EVOH/PO (PO=hydrophobic acid-functionalized resin for this embodiment); PVC/EC/EVOH/AD/PO (EC=acid-functionalized ethylene terpolymer resin composition for this embodiment)

Six layers: PVC/EC/AD/EVOH/AD/PO

Seven layers: PVC/EC/AD/EVOH/AD/PO/PO, PVC/EC/PO/AD/EVOH/AD/PO

Eight layers: PVC/EC/AD/EVOH/AD/EVOH/AD/PO, PVC/EC/PO/AD/EVOH/AD/PO/PO

For preventing moisture in order to avoid degrading oxygen barrier property, a structure, in which the EVOH resin composition layer as the core layer and the hydrophobic resin composition layer is used as the second outer layer, is used, with the structure PVC/EC/AD/EVOH/AD/PO being preferred.

Regarding the thickness of a multilayer film in accordance with one embodiment of the present invention, the total thickness thereof is typically from about 100 μm, or from about 200 μm, or from about 300 μm, or from about 400 μm, to about 4000 μm, or to about 3500 μm, or to about 3000 μm, or to about 2500 μm.

The thickness of the first outer layer (PVC layer) in the film is not particularly limited, but is typically from about 50 μm, or from about 100 μm, or from about 150 μm, to about 3000 μm, or to about from 2500 μm, or to about 2000 μm.

The thickness of the first internal layer (EC layer) in the film is not particularly limited, but is typically from about 10 μm, or from about 20 μm, or from about 30 μm, to about 300 μm, or to about 250 μm, or to about 200 μm.

The thickness of each adhesive layer (AD layer) in the film is not particularly limited, but is typically from about 5 μm, or from about 10 μm, or from about 15 μm, to about 150 μm, or to about 125 μm, or to about 100 μm.

The thickness of the core layer (EVOH layer) in the film is not particularly limited, but is typically from about 5 μm, or from about 10 μm, or from about 15 μm, to about 150 μm, or to about 125 μm, or to about 100 μm.

The thickness of the second layer (PO layer) in the film is not particularly limited, but is typically from about 20 μm, or from about 40 μm, or from about 60 μm, to about 2000 μm, or to about 1500 μm, or to about 1000 μm.

Methods of producing multilayer articles in accordance with the present invention are broadly classified into a process involving melting the EVOH resin composition, ethylene terpolymer, adhesive resin and hydrophobic thermoplastic resin, then molding the resultant melt (a melt molding process), and also this process involves melting the PVC resin composition and then being thermal laminated with the said multilayer structure after melted in process, for example. Specific examples thereof include the following: melt extrusion of EVOH resin composition, ethylene terpolymer, adhesive resin and hydrophobic thermoplastic resin, PVC resin composition to form each layer; coextruding all layers except PVC resin composition layer, the layers are then disposed in a side-by-side relationship to form a multilayer structure; the outer polyvinyl chloride polymer layer being thermally laminated with the said multilayer structure after extruded in process.

EXAMPLES

The present invention is more specifically described by way of examples. The scope of the present invention, however, is not limited to these examples.

Example 1—PVC/EC1/MAh Modified EVA/EVOH/MAh Modified PE/LLDPE Multilayer Sheet

Ethylene Unit Content in and Saponification Degree of EVOH

Measurement was conducted by $^1$H-NMR measurement (JNM-GX-500, JEOL Ltd., Tokyo Japan) using DMSO-d$_6$ as a solvent.

Melt Flow Rate (MFR)

The discharging rate (g/10 minutes) of a sample was measured by a melt flow indexer (MP200, Tinius Olsen TMC, Horsham, Pa. USA) under conditions of a temperature at 190° C. and with a load of 2160 g.

Conditions for Preparing Co-Extruded EVOH Film

The co-extruded EVOH multilayer film for Example 1 was prepared under the following conditions, followed by trimming into a film. The thickness of each layer and total thickness are shown in Table 1.

Layer Structure 5-material-5-layer (EC/AD1/EVOH/AD2/PO)

EC1 layer: E/nBA/CO copolymer (ELVALOY® HP441, E. I. du Pont de Nemours and Company, Wilmington, Del. USA)

AD1 layer: MAh modified EVA (BYNEL® 3810, E. I. du Pont de Nemours and Company, Wilmington, Del. USA)

EVOH layer: EVOH (EVAL™ H171B, Kuraray America, Inc., Houston, Tex. USA) (Ethylene Content: 38 mol %, Saponification degree 99.9%, MFR=1.7 g/10 min)

AD2 layer: MAh modified PE (ADMER™ NF528E, Mitsui Chemicals Europe GmbH, Dusseldorf, Germany)

PO layer: LLDPE (SCLAIR FP120-A, NOVA Chemicals Corporation, Calgary, Alberta Canada)

Conditions for Film Formation

Apparatus: a 7-material-7-layer blown film extruder (Brampton Engineering, Brampton, Ontario Canada)

Extruder

Extruder A: 45-mmφ single screw extruder (L/D=24),
Extruder B: 30-mmφ single screw extruder (L/D=24),
Extruder C: 30-mmφ single screw extruder (L/D=24),
Extruder D: 30-mmφ single screw extruder (L/D=20),
Extruder E: 30-mmφ single screw extruder (L/D=24),
Extruder F: 30-mmφ single screw extruder (L/D=24),
Extruder G: 45-mmφ single screw extruder (L/D=24)

Extruder B is for EC layer, Extruder C is for AD1 layer, Extruder D is for EVOH layer, Extruder E is for AD2 layer and Extruder F is for PO layer.

Extruder A and G were not used for making the five-layer coextruded film.

Temperature Setting (° C.):

Extruder B and F: C1/C2/C3/A=180/190/205/205
Extruder C and E: C1/C2/C3/A=190/225/215/220
Extruder D: C1/C2/C3/A=180/210/215/220
Die: 150 mm, temperature set at 220° C.

Conditions for Preparing PVC/Co-Extruded EVOH Multilayer Sheet

PVC sheet (manufactured by Nilex Inc., Edmonton, Alberta Canada) was laminated with co-extruded EVOH film as follows.

A compression press (Model 2699, Carver Inc., Wabash, Ind. USA) was set at 180° C. 100 micron polytetrafluoroethylene sheet was put on the lower hot surface of the machine. PVC sheet was put on the polytetrafluoroethylene sheet. Co-extruded EVOH film was put on PVC sheet with contacting EC layer on PVC layer. Another polytetrafluoroethylene sheet covered the film and sheet. Then, thermal lamination was conducted at 10 MPa for 5 minutes.

Evaluation of the Sheet

Measuring of Thickness of PVC/Co-Extruded EVOH Multilayer Sheet

Samples were collected from center of width of the multilayer sheet. Collected samples were cut by knife and sliced by microtome. Layer thickness was measured by microscope (manufactured by Nikon).

Adhesion Strength

After the thermal lamination, the PVC/co-extruded EVOH multilayer sheet was cut into 15 mm wide sections. The interface between PVC and co-extruded EVOH was tested by attempting to be peel the PVC layer off. If the sample could not be peeled, it was evaluated as "A". If the sample could be peeled, adhesion strength was measured by using a tensile tester (Model 4466, Instron, Norwood, Mass. USA) at tensile speed of 250 mm/min. The adhesion strength was evaluated by the criteria below and the results are summarized in Table 2.

A: Impossible to peel off (Breakage)
B: Adhesion strength over 200 g/15 mm
C: Adhesion strength below 200 g/l 5 mm Permeation Coefficient Stainless steel diffusion cells with source and receptor compartments were used for the aqueous diffusion test. The multilayer sheet sample was secured between the source and receptor compartments. The source and receptor were sampled until equilibrium was reached. Samples were taken frequently at early stages of testing, and a decreased frequency at later stages, when changes in concentration were smaller. Cells were agitated by magnetic stirrers and maintained at 22° C. Once equilibrium was reached, a mass balance was performed to check that there was no significant leakage from the cells during the tests. Samples were tested using a dilute aqueous BTEX (Benzene/Toluene/Ethyl Benzene/Xylene) source solution with initial concentrations of approximately 20-40 μg/g. Deionized water was placed into the cell receptor compartment.

Source and receptor diffusion samples were analyzed by purge and trap gas chromatography/mass spectrometry (P&T)-GC/MS using selective ion monitoring (SIM) using a Hewlett Packard 5890 GC with a P&T unit and 5972 mass selective detector. The VOC P&T method was based on USDA method 8260B.

The diffusion from the source to the receptor was plotted normalized with respect to the initial source concentration (C) for the specific compound and the samples with time. The diffusion tests were characterized by a decrease in source concentration coupled with an increase in receptor concentration until both values eventually reached equilibrium. The vapor barriers reached equilibrium within approximately 0-14 days. The diffusion coefficients (D) and partition coefficients (S) were inferred by fitting the results of the theoretical model to the observed change in concentrations with time. Permeation coefficients (P) were calculated by formula (III) below and summarized in Table 2.

$$P=S*D \qquad (III)$$

Tensile Modulus

In accordance with ISO527-3, tensile modulus of the PVC/coextruded EVOH multilayer sheet was evaluated. The sample was subjected to humidity conditioning under conditions of 23° C./50% RH. Then, the sample was cut into a strip having a width of 15 mm and a length of 12 cm. Tensile modulus was measured by tensile tester (Model 4466, Instron, Norwood, Mass. USA) in MD direction at chuck distance of 50 mm and a tensile speed of 5 mm/minute. Tensile modulus was calculated from the stress-strain curve and summarized in Table 2.

Bleed Out

The sheet samples covered a 100 mL metal container filled with BTEX (Benzene/Toluene/Ethyl Benzene/Xylene=25/25/25/25 wt %) solvent. PVC layer of the sheet samples faced outside. The container was placed in oven at 80° C./1 month. After that, sample surface was analyzed by Fourier transform infrared spectroscopy (FT-IR) (Nicolet 6700, Thermo Electron Corporation, Madison, Wis. USA) with ATR (attenuated total reflection) mode. The presence of bleed-out of the plasticizer was checked from the FT-IR chart and rated as either the following X or Y:
X: no bleed-out observed.
Y: bleed-out observed.
The results are summarized in Table 2.

Example 2—PVC/EC2/MAh Modified EVA/EVOH/MAh Modified PE/LLDPE Multilayer Sheet

The co-extruded film for Example 2 was prepared in the same manner as Example 1, except that an E/VA/CO copolymer (ELVALOY® 4924, E. I. du Pont de Nemours and Company, Wilmington, Del. USA) was used as EC layer.
PVC/co-extruded film multilayer sheet was prepared in the same manner as Example 1.
Thickness and adhesion strength were measured in the same manner as Example 1, and the results are shown in Table 1.

Comparative Example 1—PVC/LLDPE/MAh Modified PE/EVOH/MAh Modified PE/LLDPE Multilayer Sheet Co-extruded EVOH film was prepared in the same manner as Example 1 except that LLDPE (SCLAIR FP120-A, NOVA Chemicals Corporation, Calgary, Alberta Canada) was used as the first internal layer and MAh modified PE (ADMER™ NF528E, Mitsui Chemicals Europe GmbH, Dusseldorf, Germany) was used as AD1 layer.
PVC/Co-extruded EVOH film was prepared in the same manner as Example 1.
Thickness and adhesion strength were measured in the same manner as Example 1, and the results are shown in Table 1.

Comparative Example 2—PVC/PP/MAh Modified PP/EVOH/MAh Modified PE/LLDPE Multilayer Sheet Co-extruded film was prepared in the same manner as Example 1 except that PP (Pro-fax 6523, LyondellBasell, Houston, Tex. USA) was used as the first internal layer and MAh-PP (ADMER™ QF551E, Mitsui Chemicals Europe GmbH, Dusseldorf, Germany) was used as AD1 layer.
PVC/co-extruded film multilayer sheet was prepared in the same manner as Example 1.
Thickness and adhesion strength were measured in the same manner as Example 1, and the results are shown in Table 1.

Comparative Example 3—PVC/EVA/MAh Modified EVA/EVOH/MAh Modified PE/LLDPE Multilayer Sheet Co-extruded EVOH film was prepared in the same manner as Example 1 except that EVA (ELVAX® 3150, E. I. du Pont de Nemours and Company, Wilmington, Del. USA) was used as the first internal layer.
PVC/co-extruded EVOH film was prepared in the same manner as Example 1.
Thickness and adhesion strength were measured in the same manner as Example 1, and the results are shown in Table 1.

Comparative Example 4—PVC Monolayer Sheet

PVC monolayer sheet (manufactured by Nilex Inc., Edmonton, Alberta Canada) was evaluated instead of PVC/Co-extruded film multilayer sheet.
Thickness, permeation coefficient, tensile modulus and bleed out were measured in the same manner as Example 1, and the results are shown in Table 2.

Comparative Example 5—LLDPE/MAh Modified PE/EVOH/MAh Modified PE/LLDPE Co-Extruded Sheet Co-extruded film was prepared in the same manner as Example 1 except that the target thickness was changed, LLDPE (SCLAIR FP120-A, NOVA Chemicals Corporation, Calgary, Alberta Canada) was used as the first internal layer, and MAh-PE (ADMER™ NF528E, Mitsui Chemicals Europe GmbH, Dusseldorf, Germany) was used as AD1 layer.
The Co-extruded film was not laminated with PVC.
Thickness, permeation coefficient, tensile modulus and bleed out were measured in the same manner as Example 1, and the results are shown in Table 2.

TABLE 1

|  | Example 1 | Example 2 | Comparative Example 1 | Comparative Example 2 | Comparative Example 3 |
|---|---|---|---|---|---|
| Sheet structure | PVC/EC1/MAh-EVA/EVOH/MAh-PE/LLDPE | PVC/EC2/MAh-EVA/EVOH/MAh-PE/LLDPE | PVC/LLDPE/MAh-PE/EVOH/MAh-PE/LLDPE | PVC/PP/MAh-PP/EVOH/MAh-PE/LLDPE | PVC/EVA/MAh-EVA/EVOH/MAh-PE/LLDPE |
| Thickness (μm) | 766/56/28/21/32/122 | 764/62/32/20/31/118 | 765/58/33/22/32/119 | 758/59/32/19/31/120 | 762/58/30/22/32/121 |
| Adhesion strength | A | A | C | C | C |

TABLE 2

|  | | Example 1 | Comparative Example 4 | Comparative Example 5 |
|---|---|---|---|---|
| | Sheet structure | PVC/EC1/MAh-EVA/EVOH/MAh-PE/LLDPE | PVC | LLDPE/MAh-PE/EVOH/MAh-PE/LLDPE |
| | Thickness (μm) | 766/56/28/21/32/122 | 1023 | 464/42/22/43/456 |
| Permeation coefficient ($m^2/s$) | Benzene | $0019 * 10^{-10}$ | $1.2 * 10^{-10}$ | $0.018 * 10^{-10}$ |
| | Toluene | $0.031 * 10^{-10}$ | $2.8 * 10^{-10}$ | $0.030 * 10^{-10}$ |
| | Ethylbenezene | $0.059 * 10^{-10}$ | $5.7 * 10^{-10}$ | $0.056 * 10^{-10}$ |
| | m-Xylene and p-Xylene | $0.050 * 10^{-10}$ | $7.0 * 10^{-10}$ | $0.048 * 10^{-10}$ |
| | o-Xylene | $0.043 * 10^{-10}$ | $6.4 * 10^{-10}$ | $0.041 * 10^{-10}$ |
| | Tensile modulus (MPa) | 150 | 7.0 | 560 |
| | Bleed out of Plasticizer | X | Y | — |

The test results show that a PVC/co-extruded film multilayer sheet in accordance with the present invention is suitable for geomembrane applications in terms of a desirable combination of barrier properties for BTEX, flexibility and long-term use.

As shown in Table 1, Example 1 and 2 having ethylene terpolymer as an internal layer (the first internal layer) between the PVC and AD1 layers had strong adhesion strength with PVC sheet. On the other hand, comparative examples 1-3 having PE, PP and EVA (standard polyolefin types) as an internal layer (the first internal layer) between the PVC and AD1 layers could not adhere with the PVC layer. By applying an ethylene thermpolymer as a the first internal layer between the PVC and AD1 layers, consequently, a PVC/co-extruded film multilayer sheet was able to be fabricated with enough adhesion strength for practical use such as geomembrane.

As shown in Table 2, Example 1 (which was PVC/co-extruded film multilayer sheet) showed excellent barrier properties for BTEX solvent with high flexibility. On the other hand, comparative example 4 (which was a monolayer PVC sheet of comparable thickness) did not have sufficient barrier properties for BTEX solvent. Comparative example 5 (which was a co-extruded multilayer film of comparable thickness, but no PVC outer layer) sheet had high barrier properties for BTEX solvent but was very rigid.

Furthermore, bleed out of plasticizer from the PVC layer was not observed in Example 1, but observed in comparative example 4. Absorption of BTEX solvent in the PVC layer appeared to accelerate bleed out of plasticizer. The use of an EVOH layer (core layer) can prevent absorption of BTEX solvent in PVC layer and reduce or even prevent bleed out of plasticizer from PVC.

The invention claimed is:

1. A multilayer sheet comprising at least:
   (a) a first outer layer comprising a film of a polyvinyl chloride resin composition, the first outer layer having an inner surface and an outer surface;
   (b) a second outer layer comprising a film of a hydrophobic resin composition, the second outer layer having an inner surface and an outer surface;
   (c) a core layer between the first outer layer and the second outer layer, the core layer comprising a film of an ethylene-vinyl alcohol copolymer resin composition, the core layer having an upper surface in the direction of the first outer layer and a lower surface in the direction of the second outer layer;
   (d) a first internal layer between the first outer layer and the core layer, the first internal layer comprising a film of an ethylene carbon monoxide terpolymer resin composition, the first internal layer comprising a top surface in the direction of the first outer layer and a bottom surface in the direction of the core layer, wherein the top surface of the first internal layer is in contact with the inner surface of the first outer layer;
   (e) optionally a first adhesive resin layer between the first internal layer and the core layer, the first adhesive resin layer comprising a film of a first acid-functionalized polymer resin composition, the first adhesive resin layer having a top surface in the direction of the first outer layer and a bottom surface in the direction of the core layer; and
   (f) optionally a second adhesive resin layer between the second outer layer and the core layer, the second adhesive resin layer comprising a film of a second acid-functionalized polymer resin composition, the second adhesive resin layer having a top surface in the direction of the core layer and a bottom surface in the direction of the second outer layer;

wherein:
   (I) if the first adhesive resin layer is present, then the bottom surface of the first adhesive resin layer is in contact with the upper surface of the core layer;
   (II) if the first adhesive resin layer is not present, then (i) the first internal layer comprises a film of an acid-functionalized ethylene carbon monoxide terpolymer resin composition, and (ii) the bottom surface of the first internal layer is in contact with the upper surface of the core layer;
   (III) if the second adhesive resin layer is present, then the top surface of the second adhesive resin layer is in contact with the lower surface of the core layer; and
   (IV) if the second adhesive resin layer is not present, then (i) the second outer layer comprises a film of a hydrophobic acid-functionalized resin composition, and (ii) the inner surface of the second outer layer is in contact with the lower surface of the core layer.

2. The multilayer sheet of claim 1, wherein:
   (i) the total thickness thereof is from about 100 μm to about 4000 μm;
   (ii) the thickness of the first outer layer is from about 50 μm to about 3000 μm;
   (iii) the thickness of the first internal layer is from about 10 μm to about 300 μm;
   (iv) if present, the thickness of the first adhesive layer is from about 5 μm to about 150 μm;
   (v) if present, the thickness of second adhesive layer is from about 5 μm to about 150 μm;
   (vi) the thickness of the core layer is from about 5 μm to about 150 μm; and
   (vii) the thickness of the second outer layer is from about 20 μm to about 2000 μm.

3. The multilayer sheet of claim 1, which is a four-layer sheet and does not contain either of the first adhesive resin layer or the second adhesive resin layer.

4. The multilayer sheet of claim 1, which is a five-layer sheet and contains one of the first adhesive resin layer or the second adhesive resin layer.

5. The multilayer sheet of claim 1, which is a six-layer sheet and contains both the first adhesive resin layer and the second adhesive resin layer.

6. The multilayer sheet of claim 2, which is a four-layer sheet and does not contain either of the first adhesive resin layer or the second adhesive resin layer.

7. The multilayer sheet of claim 2, which is a five-layer sheet and contains one of the first adhesive resin layer or the second adhesive resin layer.

8. The multilayer sheet of claim 2, which is a six-layer sheet and contains both the first adhesive resin layer and the second adhesive resin layer.

9. The multilayer sheet of claim 1, wherein the ethylene terpolymer resin composition comprises a predominant amount of an ethylene terpolymer selected from an ethylene/n-butyl acrylate/carbon monoxide terpolymer and an ethylene/vinyl acetate/carbon monoxide terpolymer.

10. The multilayer sheet of claim 1, wherein if present each of the first acid-functionalized polymer resin composition and the second acid-functionalized resin composition individually comprises a maleic anhydride-modified polymer selected from the group consisting of a polyethylene modified with maleic anhydride, a polypropylene modified with maleic anhydride, a maleic anhydride-modified ethylene-ethyl acrylate copolymer, and a maleic anhydride graft-modified ethylene-vinyl acetate copolymer.

11. The multilayer sheet of claim 10, wherein if present the first acid-functionalized polymer resin composition and/or the second acid-functionalized resin composition individually comprises a polyethylene modified with maleic anhydride.

12. The multilayer sheet of claim 10, wherein if present the first acid-functionalized polymer resin composition and/or the second acid-functionalized resin composition individually comprises a maleic-anhydride graft-modified ethylene-vinyl acetate copolymer.

13. The multilayer sheet of claim 2, wherein both the first adhesive resin layer and the second adhesive resin layer are present, and the first acid-functionalized polymer resin composition and the second acid-functionalized resin composition comprise different acid-functionalized resins.

14. The multilayer sheet of claim 1, which comprises more than six layers, and further comprises:
    (i) at least one additional layer between the first adhesive layer and the first internal layer;
    (ii) at least one additional layer between the second adhesive layer and the second outer layer; or
    (iii) both (i) and (ii).

15. The multilayer sheet of claim 2, which comprises more than six layers, and further comprises:
    (i) at least one additional layer between the first adhesive layer and the first internal layer;
    (ii) at least one additional layer between the second adhesive layer and the second outer layer; or
    (iii) both (i) and (ii).

16. The multilayer sheet of claim 1, wherein the ethylene-vinyl alcohol resin composition comprises a predominant amount of an ethylene-vinyl alcohol copolymer having a degree of saponification of about 99 mol % or greater.

17. The multilayer sheet of claim 1, wherein the ethylene-vinyl alcohol resin composition comprises a predominant amount of an ethylene-vinyl alcohol copolymer having an ethylene content of about 18 mol % or greater and about 55 mol % or less.

18. The multilayer sheet of claim 1, wherein all layers except the first outer layer are present as a co-extruded multilayer structure.

19. The multilayer sheet of claim 1, having permeation coefficient for benzene, toluene, ethyl benzene and xylene of less than $0.1*10^{-10}$ m2/s.

20. A process for the preparation of a multilayer sheet according to claim 1,
    (i) coextruding all layers except the first outer layer to produce a multilayer structure; and
    (ii) thermally laminating the first outer layer to the multilayer structure.

* * * * *